United States Patent
Tazartes et al.

(10) Patent No.: US 6,931,358 B2
(45) Date of Patent: Aug. 16, 2005

(54) SYSTEM AND METHOD FOR PROVIDING HIGH PERFORMANCE QUANTIZER PROCESSING

(75) Inventors: Daniel A. Tazartes, West Hills, CA (US); Peter Kyriacou, Sun Valley, CA (US); Shaw-Wen Fann, Woodland Hills, CA (US); James G. Marsden, West Hills, CA (US)

(73) Assignee: Northrop Grumman Corporation, Woodland Hills, CA (US)

( * ) Notice: Subject to any disclaimer, the term of this patent is extended or adjusted under 35 U.S.C. 154(b) by 176 days.

(21) Appl. No.: 10/270,817

(22) Filed: Oct. 14, 2002

(65) Prior Publication Data

US 2004/0088143 A1 May 6, 2004

(51) Int. Cl.[7] .................................................. H03F 1/26
(52) U.S. Cl. ....................................................... 702/189
(58) Field of Search .......................... 702/189; 710/22; 704/470, 270; 370/332, 395, 391, 374, 235; 422/82.01; 706/52; 455/450, 509, 519, 445, 63; 705/27, 26

(56) References Cited

U.S. PATENT DOCUMENTS

2003/0144018 A1 * 7/2003 Minnick et al. ............ 455/519

FOREIGN PATENT DOCUMENTS

EP 0 389 156 A2 3/1990

\* cited by examiner

*Primary Examiner*—John Barlow
*Assistant Examiner*—Tung S Lau

(57) ABSTRACT

A system and method for performing high performance quantizer processing of sensor data in a multiple-channel quantizer system. A reset prioritization scheme is provided for current sources connected to an integrator in the multiple-channel quantizer for preventing saturation of the various quantizer channels. The reset prioritization scheme determines the channels most in need of a reset to prevent saturation based upon predicted quantizer signals to appear on the channels during the next processing cycle of the quantizer system. This method of controlling the reset processing permits significantly higher acceleration capacity by preventing quantizer channel saturation in system utilizing accelerometers. The quantizer processing method further includes an improved calibration scheme for self-calibrating the various channels in a multiple-channel quantizer to account for multiple sources of error, including quantizer bias, asymmetry between applied positive and negative resets, and voltage scale factor of the quantizer channel in calibration.

17 Claims, 6 Drawing Sheets

SYSTEM AND METHOD FOR PROVIDING HIGH PERFORMANCE QUANTIZER PROCESSING

BACKGROUND OF THE INVENTION

1. Field of the Invention

The present invention relates generally to a system and method for providing high performance quantizer processing, and specifically to a system and method for providing high performance quantizer processing of sensor outputs in an inertial navigation system.

2. Description of Related Art

Aircraft inertial navigation relies upon the integration of data in order to achieve accurate tracking of the parameters of interest. The inertial navigation system of an aircraft includes various sensors, including accelerometers and gyroscopes, that convert the effects of inertial forces into acceleration, velocity and position measurements. The accelerometers determine acceleration forces along three orthogonal sensitive axes and this data is converted, through integrations, into the aircraft's velocity and position. The sensed acceleration is integrated to velocity in hardware, and the change in velocity across a predetermined interval of time is the value that is sampled by the inertial navigation system computer.

Due to the fact that the integrator will become saturated when its voltage limits are exceeded, it is impossible to integrate for an indefinite period of time without exceeding the voltage limits of the integrator. A quantizer is commonly used to integrate the instantaneous analog current (proportional to the instantaneous acceleration) output from an accelerometer, which is in turn used to measure the change in velocity. To prevent saturation of the integrator from occurring, the quantizer applies current resets to the integrator in order to keep the voltage bounded within its limits. These resets do not actually reset the integrator to zero, as this would cause a loss of velocity information, but instead the resets add or subtract (depending on polarity) a very precise amount of charge from the integrator.

A quantizer typically includes two constant current sources (a positive and a negative) connected to the integrator in order to respectively apply these precise amounts of charge to the integrator. The current sources apply fixed values of current, which enables a precise amount of charge to be added or subtracted by precisely controlling the amount of time a switch connected to a respective current source is closed to allow current flow. As long as the amount of reset charge is known precisely, the integrator output can be adjusted to accurately account for these resets in the system computer. Certain differences and errors in the applied positive and negative resets may provide sources of error in the integrator output.

Error sources that affect the accuracy of the integrator output require compensation to ensure accuracy of the navigation system measurements and functions. Because inertial grade instruments are required to measure a very large dynamic range of motions, they typically rely on state of the art technologies and must be able to measure extremely small quantities. For example, a navigation grade accelerometer must measure a few millionths of the standard gravity acceleration. Even the smallest errors can yield inaccurate results, where errors, such as bias, appearing in a quantizer are strongly dependent upon temperature and other sources. One possible source of error appearing in the integrator output results from the presence of a capacitor in the integrator hardware, where the capacitance (C) of the capacitor variably fluctuates proportionally with fluctuations in temperature. This capacitance (C) is used to formulate a voltage scale factor (1/C), which is used to convert the voltage output of the integrator to a desired measurement unit (i.e., velocity). Since the precise amount of reset charge being applied is known, it is also necessary to determine the precise value of the voltage scale factor in order to accurately determine the output of the integrator.

A quantizer typically includes a positive current source and a negative current source for applying respective resets, where it is possible for an asymmetry to exist between the positive and negative reset currents. This asymmetry causes the integrator output to drift in a direction corresponding to the unequal reset currents being applied, which will lead to inaccurate control of the integrator. Another possible source of error arises from a value of quantizer bias resulting from leakage currents being fed into the integrator. In order to account for such errors, it is desirable to provide for periodical calibration of the quantizer to detect and account for any asymmetry in the reset currents, voltage scale factor errors, and bias from leakage currents.

Typically, three accelerometers are provided in an INS for determining acceleration forces acting in three orthogonal axes, so the quantizer includes a respective channel for each direction of measured acceleration. In order to maintain three continuously operating channels for constantly measuring acceleration in three orthogonal directions, an extra fourth channel must be provided for calibration purposes. Whenever there is a need to calibrate one of the channels, the extra channel which is not being used to measure acceleration is switched with the channel requiring calibration. In this manner, three of the four channels are continuously operating in a data mode with the remaining channel operating in a calibration mode, where one of the channels is variably selected to be calibrated based on the operation of the quantizer.

A quantizer having multiple channels must be able to apply positive and negative resets to each of the channels to prevent all of the channels from becoming saturated. It is possible to provide a pair of current sources for each respective channel to apply these positive and negative resets, but requiring such a large number of current sources would greatly add to the cost of the quantizer as well as adding to the complexity of its circuitry. Thus, it is desirable for a quantizer to possess merely a single pair of current sources which are multiplexed between the channels for providing resets to the channels. The problem with existing quantizers which utilize only one pair of current sources for providing positive and negative resets to all of the channels is that the channels are merely cyclically connected to the current sources for resets to be applied without taking into account which channels are actually close to their saturation point and require application of a reset value.

There is clearly a need for a system and method for providing an improved quantizer processing scheme for determining which channels in a multi-channel quantizer are close to saturation and prioritizing the order in which the channels shall have resets applied thereto to prevent saturation of each of the various channels. Furthermore, there is a need to provide an improved and more robust calibration scheme for a multi-channel quantizer to accurately account for multiple sources of quantizer error in each of channels during in the field operation of the quantizer.

SUMMARY OF THE INVENTION

The present invention provides, in a first aspect, a system and method for controlling the reset prioritization scheme for current sources connected to an integrator in a multiple-channel quantizer in an inertial navigation system in order to prevent saturation of the various channels of the quantizer. A plurality of resets can be applied during each processing cycle of the inertial navigation system computer, where queues are provided for the resets to be applied by both positive and negative current sources. The reset prioritization scheme of the present invention predicts the voltages appearing on each of the quantizer channels during the next processing cycle using an extrapolation technique. The predicted quantizer voltages are then sorted to determine the channels closest to saturation which will most be in need of the application of a reset to be applied to prevent saturation. The channel most in need of a reset to prevent saturation is placed in an open position in the appropriate queue, where the assigned reset is accounted for in that channel's predicted quantizer voltage and the predicted quantizer voltages of the channels are resorted. This reset prioritization scheme is continued until each of the positions in the reset queues for the next processing cycle are filled or until no channel further requires the application of a reset. This system of controlling the reset processing in the inertial navigation system computer permits more accurate results to be obtained by preventing quantizer channel saturation.

In a second aspect of the present invention, an improved calibration scheme is provided for self-calibrating the various channels in a multiple-channel quantizer to account for multiple sources of error. The calibration scheme calculates quantizer bias, asymmetry between applied positive and negative resets, and voltage scale factor calibration for the quantizer channel in calibration.

BRIEF DESCRIPTION OF THE DRAWINGS

The features of the present invention, which are believed to be novel, are set forth with particularity in the appended claims. The present invention, both as to its organization and manner of operation, together with further advantages, may best be understood by reference to the following description, taken in connection with the accompanying drawings in which the reference numerals designate like parts throughout the figures thereof and wherein:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide a system and method of providing high performance quantizer processing.

Figure 1:
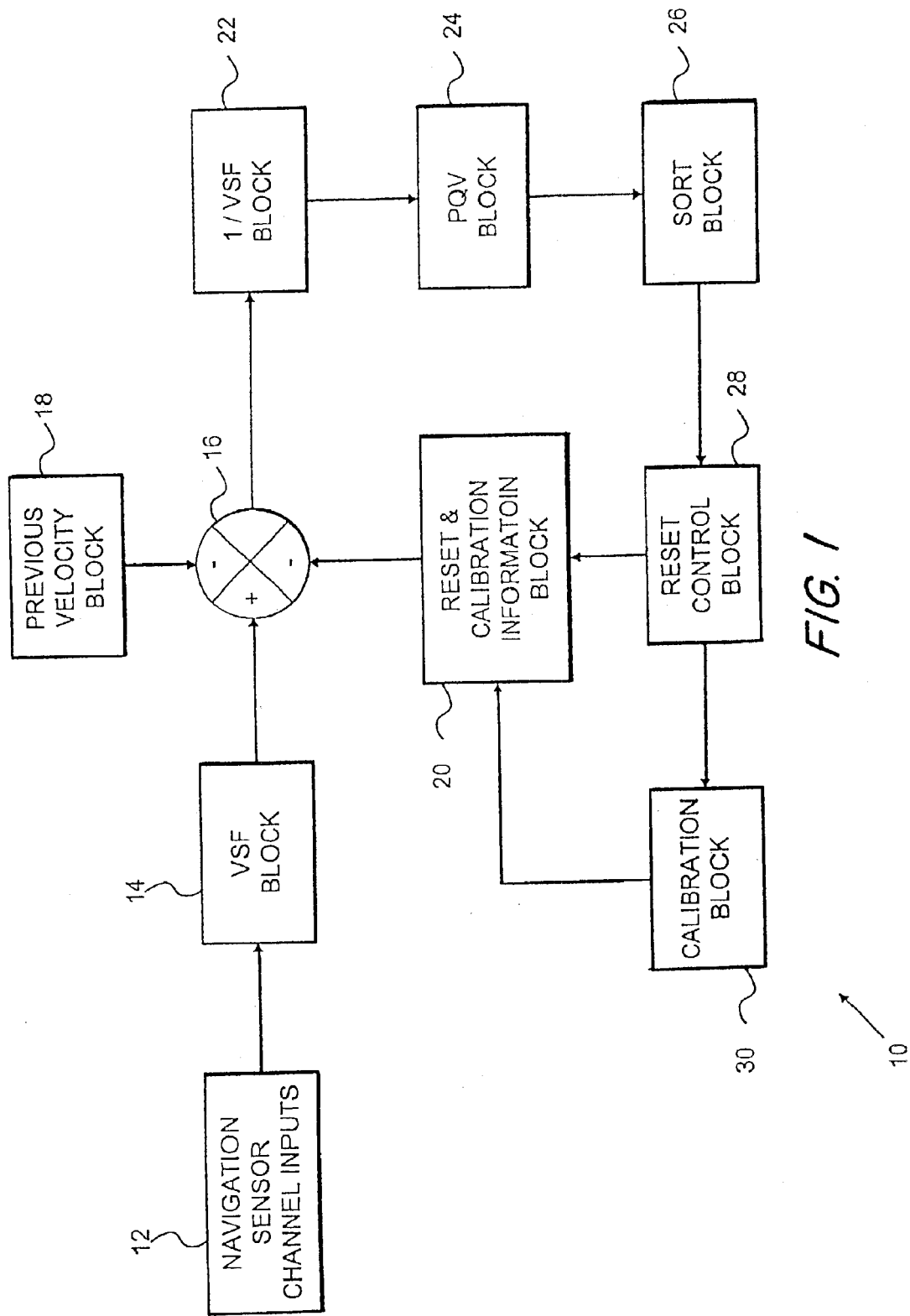
FIG. 1 is a block schematic diagram of a preferred embodiment of the quantizer processing system of the present invention.

The quantizer processing system 10 of the present invention is shown in block mechanization diagram form in FIG. 1. An inertial navigation system (INS) for an aircraft comprises navigation instruments in combination with an on-board flight computer (not shown). The quantizer processing system 10 is achieved through software running on the flight computer. The INS software permits several modes of operation including a navigation mode in which the instrument data are propagated into velocity and position. The system 10 receives inertial navigation instrument data from the navigation sensor channels 12 which represents the appropriate outputs of the navigation sensors used in the inertial navigation system, such as accelerometers or gyroscopes. It is the full intention of the inventors of the present invention that the quantizer processing system 10 may be utilized with any number of channels. Further, while the present invention will be described with reference to inputs received from a navigation sensor, it is understood that the present invention can be equally extending to a quantizer processing system for processing signals provided from any type of sensor requiring quantization. A preferred embodiment of the present invention will be described hereinafter with reference to its use in processing quantizer data received from four channels containing acceleration data provided by three accelerometers measuring acceleration in three separate directions. The navigation sensor channels 12 will contain voltages which represent the corresponding measured accelerations.

Quantizers are used in inertial navigation systems to integrate the measured accelerations to determine a change in velocity. In order to convert the measured acceleration voltages into velocities, the acceleration voltages are input into a voltage scale factor (VSF) block 14 where they are converted into velocities using a calibrated voltage scale factor for each channel. Integrating for an indefinite period of time would exceed the voltage limits of the system and saturate the quantizer. To prevent saturation, the quantizer must perform resets of the integrator to keep the voltage bounded, where these resets add or subtract (depending upon polarity) a very precise amount of charge from the integrator. The quantizer processing system 10 of the present invention determines which channel is most in need of a reset to avoid saturation and provides a robust prioritization scheme for applying resets to the various channels.

In addition block 16, the measured velocities are adjusted by calibration information for the channels as well as the reset information for the channels as provided by information block 20. The previously determined velocity values for the channels provided by previous velocity value block 18 are then subtracted from the adjusted velocities to calculate a change in velocity or incremental velocity (Δvel) for each channel. The incremental velocities are converted back into incremental voltages (ΔV) in the inverse voltage scale factor block 22. Once incremental voltages are obtained, a predicted quantizer voltage (PQV) for the next cycle of the quantizer is calculated using an extrapolation technique in PQV block 24. The PQV values for each of the channels are then sorted in sort block 26 to determine the channels with the highest predicted quantizer voltages in the next cycle. The channel having the highest PQV over a saturation threshold value is placed into a queue to have a reset applied.

After each reset is queued, the assigned reset is accounted for and the channels are again resorted by sort block 26. Once all of the resets for the next cycle are accounted for in the queue, the reset control block 28 then instructs the current sources to apply the appropriate resets to the queued channels. Lastly, calibration block 30 performs certain calibration functions on channels available for calibration, as will be described in greater detail hereinafter.

Figure 2:
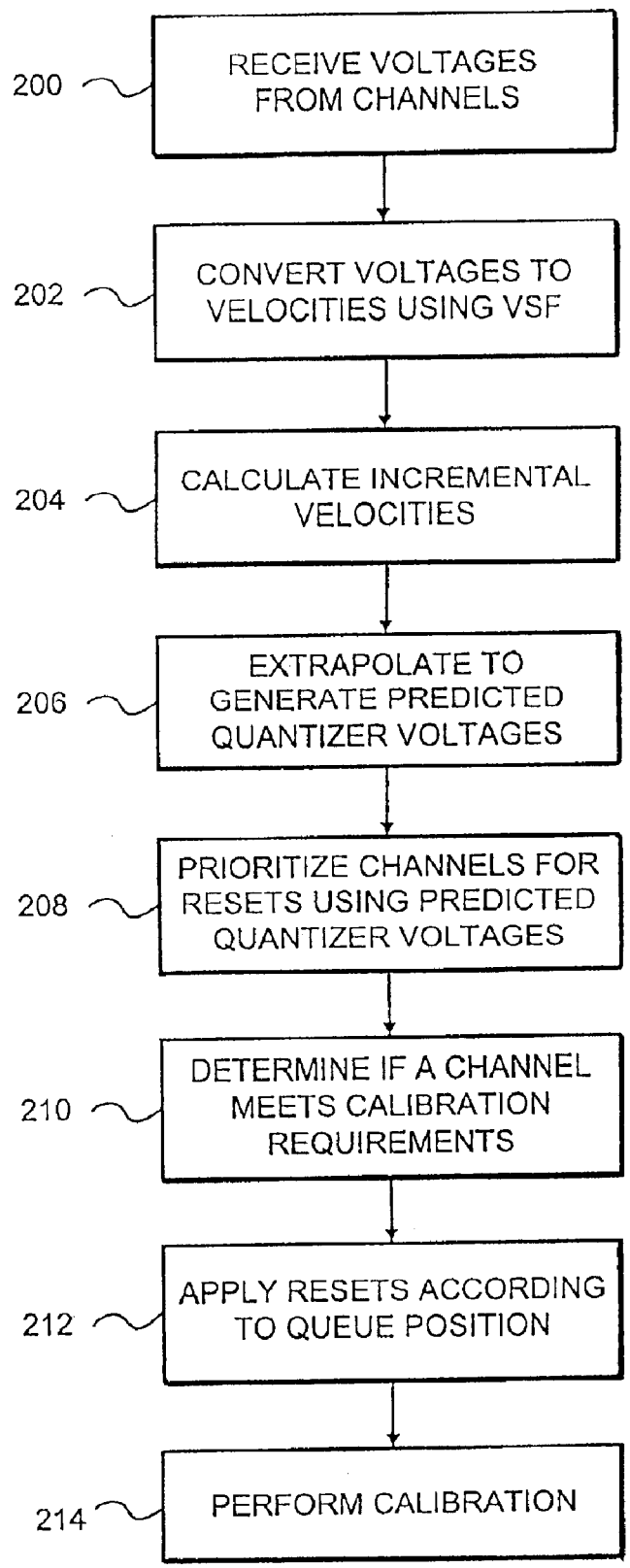
FIG. 2 is an operational block diagram of a preferred method of performing quantizer processing in accordance with the present invention.

FIG. 2 is a function block diagram of the improved quantizer processing method of the present invention. Initially in step 200, voltage inputs from the navigation sensor channels 12 are received which represent the accelerations output onto the channels from the various accelerometers. Preferably, four quantizer channels are provided with three of the channels containing voltages output by three accelerometers and the voltage measured on the fourth channel being used for calibration purposes. In step 202, the received voltages are converted to a desired quantizer unit of measurement using a voltage scale factor, such as by converting the accelerometer voltages into velocities by multiplying the voltages with a calibrated voltage scale factor for each channel.

The quantizer processing method of the present invention is designed to control a single pair of current sources (not shown) to apply the appropriate positive or negative resets (depending upon polarity) to a plurality of channels to keep all of the channels from saturating using only the single pair of current sources. The quantizer processing method will cyclically function according to the processing cycle of the flight computer which is running the quantizer processing software of the present invention. For instance, inertial navigation systems often operate at either 512 Hz or 400 Hz, where it is understood that the objectives of the present invention can be achieved on systems having any operating cycle. A certain number of resets of a predetermined duration may be applied by the pair of current sources during each processing cycle of the operating frequency of the system. The length and the number of the resets applied in each cycle can be selected to achieve the desired results for the system. When a reset is determined to be necessary to keep a channel from saturating, the particular channel is placed in a reset queue for applying the resets. However, a reset determined to be necessary during one cycle is not applied until the next cycle, where the conditions of the channels could be different during the next cycle. For example, one channel could have a higher voltage which is slowly building while another channel could have a lower voltage which is rapidly increasing. In this example, the channel with the lower voltage in the present cycle may actually have a higher voltage in the next cycle when the reset is actually applied due to its rapidly increasing voltage. As such, merely taking into account the voltages during the present cycle for resets to be applied during the next cycle does not provide a reliable manner of preventing the channels from saturating.

Thus, the quantizer processing method of the present invention prioritizes the resets to be applied according to predicted channel voltages for the next cycle. In order to predict the channel voltages for the next cycle, incremental quantizer values must first be determined in step 204. An incremental velocity ($\Delta$vel) is computed by correcting the currently measured velocity to account for resets that have been applied to the channels, where reset information has to be added to the measured velocity in order to provide an accurate value for what the measured velocity would have been had the reset not been applied to reduce the quantizer voltage to the value measured on that particular channel. The measured velocity is further corrected using channel calibration information. A previously obtained value of velocity for each channel is then subtracted from the corrected velocity measurement to produce the incremental velocity ($\Delta$vel). The incremental velocities $\Delta$vel are then converted into incremental voltages ($\Delta$V) using an inverse voltage scale factor (1/VSF).

Once incremental voltages ($\Delta$V) are obtained for each channel, a predicted quantizer voltage (PQV) for each channel during the next cycle is calculated using an extrapolation method in step 206. The PQV values are generated by adding the incremental voltages ($\Delta$V) to the current channel voltages received in step 200. The PQV for the channels are then sorted in step 208 to prioritize the channels with the highest PQV which are most in need of a reset. A certain number of resets are capable of being performed during each cycle. For instance, a maximum of four resets are issued per polarity (positive and negative) for 512 Hz or 400 Hz systems in a preferred embodiment of the present invention, while it is understood that any number of resets may be applied during each cycle depending upon the duration of the resets and the processing cycle frequency. In the situation where four positive and four negative resets are applied during each cycle, up to four channels are placed in a queue for both the positive current source and the negative current source to apply resets.

Figure 3:
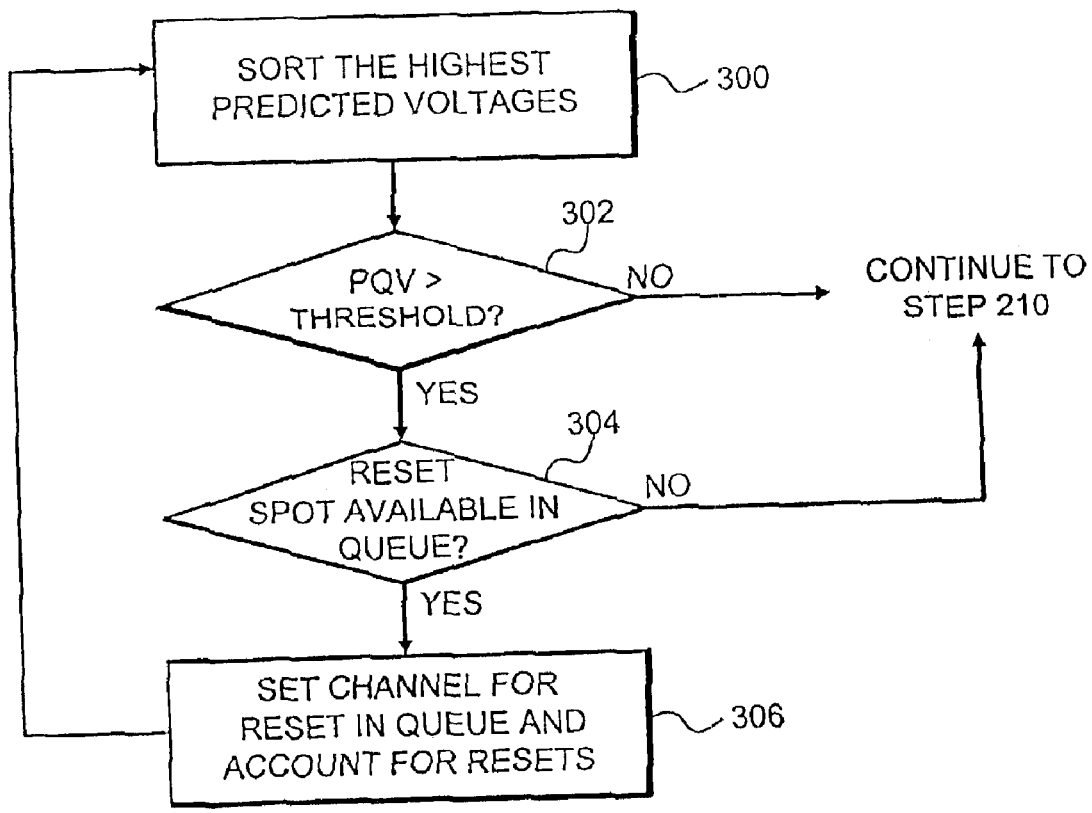
FIG. 3 is an operational block diagram of the prioritization step of FIG. 2.

With further reference to FIG. 3, the prioritization scheme of step 208 is shown in greater detail. Initially in step 300, the PQV for the channels are sorted from the highest value to the lowest value. If the highest PQV is above a certain saturation threshold value, then the channel containing the highest PQV is placed in the queue for a reset to be applied. In step 302, it is determined whether the highest PQV is above the saturation threshold value. If highest PQV is above the saturation threshold value, then it is determined in step 304 whether there is an available spot in the queue for the next cycle to apply a reset. When the queue has an available spot, the channel having the highest PQV over the saturation threshold is placed in the available queue spot in step 306. After the reset is placed into the queue, the reset is accounted for (i.e., the channel with the highest PQV that is placed into the queue is adjusted by an amount to account for the reset to be applied) and the channels are resorted again. After re-sorting the PQV for the channels, the channel with the highest PQV above the threshold value is next placed in the queue. The sorting procedure in steps 300–306 is looped through until either both of the positive and negative reset queues are filled for the next cycle or until all of the channels have a PQV beneath the saturation threshold value.

In some instances, the PQV of the channels containing accelerometer data will be below the saturation threshold value, where a reset is not required to be applied when the PQV is less than the saturation threshold. When all of the accelerometer channels have a sufficiently low PQV such as not to require a reset to be applied to the channel, the queue will then have open slots that allow resets to be assigned to the extra fourth channel for calibration purposes and control will move on to step 210 where it is determined if a channel meets the criteria for calibration. It is further determined in step 210 whether resets should be applied to the available channel for calibration purposes, where resets are respectively assigned to the available queue slots for the channel to be calibrated.

Once all of the resets have been prioritized and the positive and negative reset queues have been filled, the resets are applied by the positive and negative current sources in step 212 according to their queue position. Lastly, calibration of the extra fourth channel is performed in step 214 if the appropriate conditions for calibration have been satisfied, as will be described in greater detail hereinbelow when describing the calibration portion of the quantizer processing method of the present invention.

The reset prioritization scheme of the present invention provides an improved method of controlling the reset processing for a multiple-channel quantizer in an INS computer system which reduces the risk of integrator saturation in the quantizer, resulting in more accurate quantizer measurements. The reset prioritization scheme utilized by the present invention to schedule resets permits significantly higher acceleration capacity (i.e., g-capability) for the accelerometer measurements by scheduling resets according to predicted accelerometer measurements.

Figure 4:
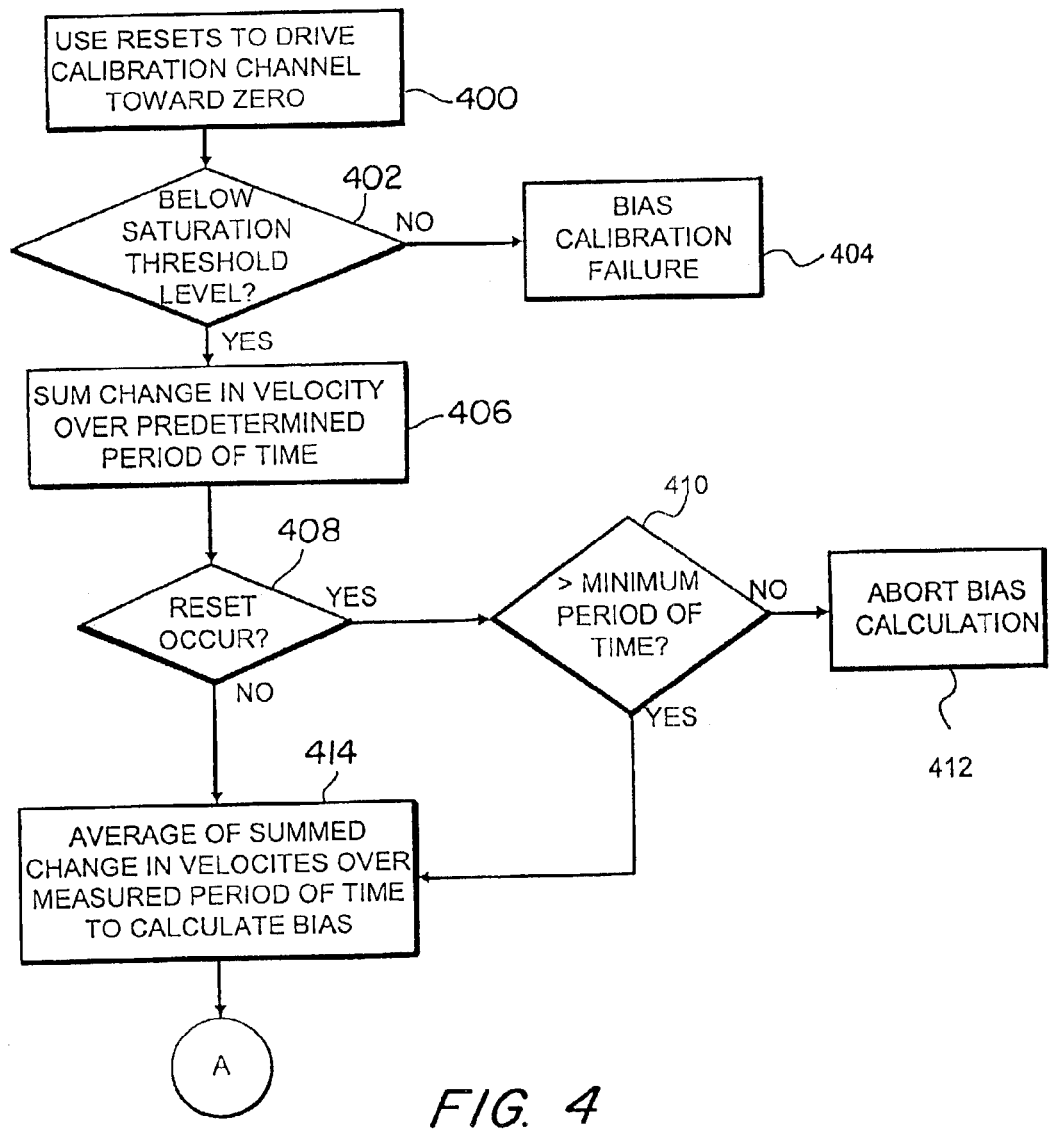
FIG. 4 is an operational block diagram of bias calculation portion of the quantizer channel calibration step of the FIG. 2.
Figure 5:
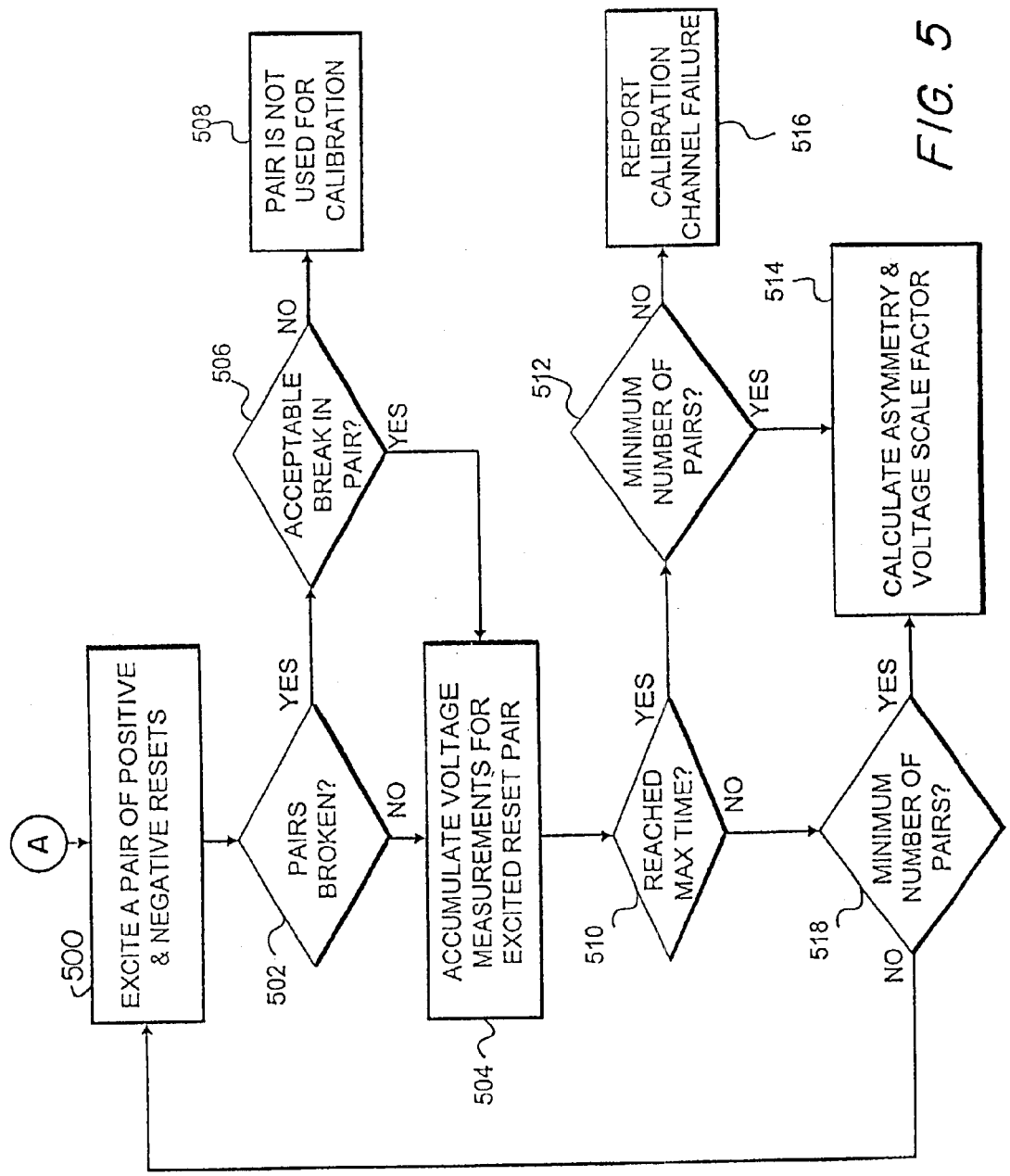
FIG. 5 is an operational block diagram of the asymmetry/voltage scale factor calculation portion of the quantizer channel calibration step of FIG. 2.

With reference to FIGS. 4 and 5, the calibration procedure of step 214 in FIG. 2 will be described in greater detail. The calibration procedure is provided for self-calibrating the various channels of the multiple-channel quantizer to account for multiple sources of error. The calibration procedure calculates quantizer bias of the calibration channel, asymmetry between resets applied by the positive and negative current sources, and voltage scale factor calibration for the quantizer channel in calibration, as well as monitoring for calibration channel failure.

Initially, the calibration procedure involves calculating the quantizer bias, shown in the operational block diagram of FIG. 4, for measuring the leakage currents which appear on the calibration channel when the calibration channel is not receiving any inputs. In order to create a steady monitoring period for measuring the quantizer bias, the voltage of the calibration channel is lowered toward a value close to zero to increase the range capability for measuring the voltage drift or bias of the quantizer. The calibration channel voltage is lowered by applying resets in step 400 to bring the voltage down to an acceptable level, preferably close to zero. The quantizer bias calibration is disabled if there are any calibration failures, such as complete quantizer saturation or reset failures. The quantizer is in complete saturation if the calibration channel voltage remains above the saturation threshold level after the resets are applied in step 400. Thus, in step 402, it is determined whether the calibration channel voltage level is below the saturation threshold level after the resets have been applied. If the calibration channel voltage is above the threshold level, the channel voltage is drifting faster than resets being applied are able to bring it below the threshold value. This indicates that the calibration channel is in complete saturation and a bias calibration failure is indicated in step 404. This channel is then kept in calibration mode and prevented from being switched to a channel used for measuring acceleration, since the channel is in complete saturation.

When the calibration channel voltage is below the threshold level, control of the bias calibration scheme moves to step 406 where the change in velocity ($\Delta$vel) is summed over a predetermined time period or a predetermined number of cycles using the incremental velocities ($\Delta$vel) computed in step 204. The bias calculation will be interrupted if a reset of the calibration channel occurs during the incremental velocity ($\Delta$vel) summing step, where it is determined in step 408 whether such a reset has occurred. If a reset has occurred and the bias calibration is aborted before the predetermined time period for bias calibration has been reached, then it is still possible to calculate a bias value if the incremental velocities ($\Delta$vel) of the calibration channel have been summed for a certain minimum period of time. The minimum period of time can be set according the desired level of accuracy of the bias calculation. It is determined in step 410 whether the summing operation has occurred for the minimum period of time. If minimum period of time has not been reached and the minimum number of incremental velocities ($\Delta$vel) have not be summed, the bias value would be inaccurate and the bias calculation is aborted in step 412. If the incremental velocity ($\Delta$vel) summing operation has occurred for either the minimum period of time after a reset is detected or for the entire predetermined period of time for bias calculation, then an average value of the summed incremental velocities ($\Delta$vel) over the number of measured cycles is computed to calculate the bias of the calibration channel in step 414.

After the bias portion of the calibration scheme is complete, the calibration scheme continues on to calculate the asymmetry between the positive and negative resets and the voltage scale factor (VSF) of the quantizer, as illustrated in the operational block diagram of FIG. 5. Initially in step 500, a pair of alternating positive and negative resets are applied by the current sources. A first reset should be allowed to settle before the next reset is applied. Thus, the resets are preferably applied during calibration on every other cycle in order to allow the effects of the previous reset to settle before applying the next reset. In order to provide for simple logic when commanding a reset in the calibration mode, the calibration reset can be set to occur in a predefined slot in the queue. This eliminates the need to fill the next available queue position with the calibration reset, and then tagging the reset with the corresponding position number in the queue. In addition to simplifying the logic, by always applying the reset in the same slot in the queue, consistent spacing between consecutive resets is achieved for providing more accurate asymmetry measurements.

Figure 6A:
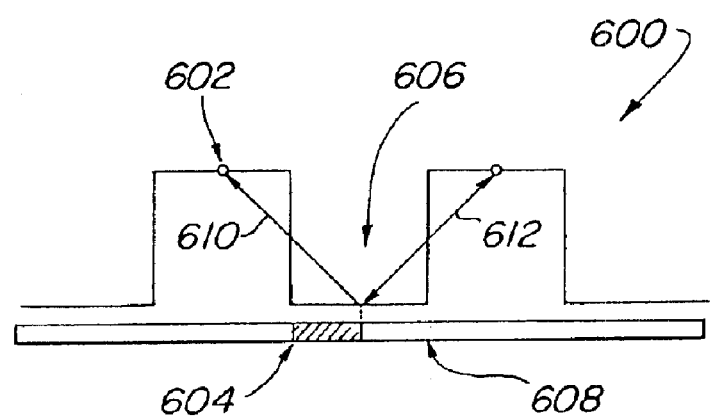
FIGS. 6A–6C illustrate examples of the voltage appearing on the calibration channel of the present invention in accordance with various types of respective pairs of consecutive alternating positive and negative resets being applied to the calibration channel.

The calibration routine utilizes consecutive pairs of alternating positive and negative resets in order to prevent contamination of the quantizer calibration measurements. Ideally, a sequence of consecutive reset pairs would occur uninterrupted over a minimum period of time to provide the necessary measurements for asymmetry/VSF calibration. In some situations, a reset pair can be interrupted or broken, such as if queue slots are unavailable for calibration resets due to resets being applied to the channels containing accelerometer data. In step 502, it is determined whether a reset pair has been broken. Referring now to FIG. 6A, the voltage appearing on the calibration channel is illustrated for a normal pair 600 of consecutive alternating positive and negative resets being applied. As can be seen, after the positive (or plus) reset command is placed in the queue to be given at 602, the positive reset is issued in the next cycle at 604. There is a one cycle delay before commanding the negative reset at 606, where the negative reset is then issued in the next cycle at 608. After completion of the positive and negative resets, the voltage differentials indicated by lines 610, 612 will be measured and utilized for asymmetry/VSF calibration calculations in step 504 of FIG. 5.

Figure 6B:
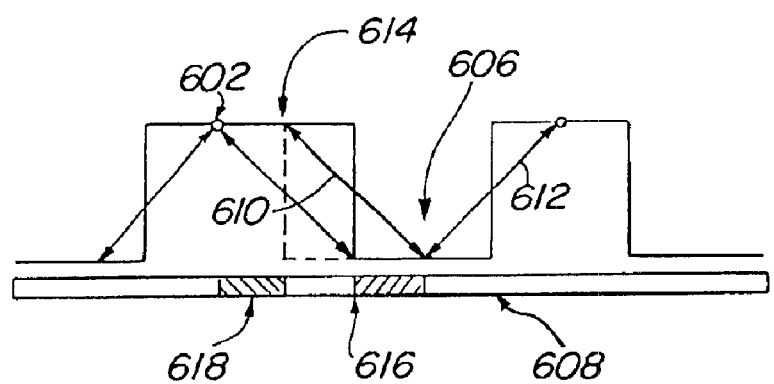

If there is a break between reset pairs, then it must be determined in step 506 whether it is an acceptable broken pair. Reset pairs can be broken for a variety of reasons, where some broken pairs are still acceptable for use in calibration calculations. For instance, an acceptable broken pair of resets is illustrated in FIG. 6B. In this situation, a positive reset should have been commanded at a point in time 602, whereas a delay, e.g. due to unavailable slots in the reset queue, caused the positive reset to be commanded at point 614. The dashed lines in FIG. 6B indicate where the positive reset was expected to be commanded and issued if not for the unexpected delay, where the solid black line indicates where the positive reset actually occurred at 616. The negative reset was then commanded and issued normally as shown. Even though there was a break between pairs of resets caused by the unexpected delay, there was no break between the positive and negative resets in the single pair itself. Thus, this pair of positive and negative resets would be acceptable to be utilized for the calibration calculations in step 504.

Figure 6C:
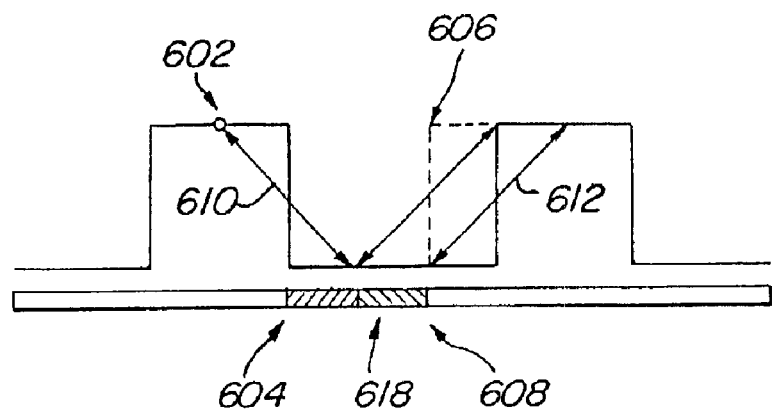

In situations where there is an interruption in the middle of consecutive positive and negative resets being applied, then the reset pair is deemed to be unacceptable for use in calibration calculations in step 508. An example of an unacceptable broken pair of resets is illustrated in FIG. 6C, where there is an unexpected delay 618 in between the issuance of positive and negative resets. The dashed lines in FIG. 6C indicate where the negative reset was expected to be issued, where the solid black line indicates where the negative reset actually occurred. The unexpected delay caused the negative reset to be commanded later than expected, resulting in a break between the positive and negative resets in the single pair (otherwise illustrated as a break between voltage differential measurements 610, 612). When a reset pair is considered to be unacceptable, this pair is not used for calibration calculations.

The asymmetry and VSF calculations occur only after a predetermined number of acceptable reset pairs are attained. A counter is preferably provided which is incremented upon completion of each acceptable pair of consecutive positive and negative resets. The calibration scheme places a maximum period of time for the predetermined number of reset pairs to occur in order to prevent one channel from remaining locked in the calibration mode for an indefinite period of time. Thus, it is determined in step 510 whether the maximum period of time has yet been reached. After reaching the maximum period of time, it is determined in step 512 whether the predetermined minimum number of acceptable reset pairs have occurred. If so, then the calibration routine calculates the asymmetry and VSF of the calibration channel in step 514. When the minimum number of acceptable reset pairs have not occurred within the maximum period of time for calibration, then a calibration channel failure is reported in step 516. If the calibration routine is still within the maximum period of time for calibration and the pre-set minimum number of reset pairs has not been reached, then control returns to step 500 where another pair of positive and negative resets is excited and the above-described calibration steps are repeated. If the minimum number of reset pairs occurs within the maximum time for calibration, then the calibration routine calculates the asymmetry and VSF of the calibration channel in step 514.

Asymmetry and VSF Calculations

The asymmetry and VSF calibration calculations performed in step 514 are made utilizing the following quantizer equations. When a channel is in calibration mode, the channel will not be receiving any inputs. Thus, the voltage (V) measured on the channel can be calculated from the following equation:

$$V = \frac{1}{C}[Q_0 - Q_P + Q_M + $$

where, $C$=Actual capacitance of the capacitor of the channel integrator $Q_0$=starting charge stored on capacitor $Q_B$=charge due to bias $Q_P$, $Q_M$=charge due to plus and minus resets The only change in voltage on the calibration channel will be the change from the voltage of the previous cycle, accounting for resets which were issued, and accounting for channel bias. By substituting $Q_0 = C_0 V_0$ into the channel voltage equation, where $C_0$ is the capacitance of the capacitor in the previous cycle, the change in velocity ($\Delta$vel) can be represented by the following equation:

$$\Delta vel = V\hat{S}F\frac{C_0}{C}V_0 + \frac{V\hat{S}F}{C}[-Q_P + Q_M + Q_B]$$
$$= -V\hat{S}F_0(V_0) + [S(1+\hat{A})]*P - [S(1-\hat{A})]*M$$

where, $\epsilon$=relative voltage scale factor (VSF) error
$V_0$=voltage from previous cycle
A=asymmetry
$\delta$=error in asymmetry being applied
B=bias being applied
b=error in bias compensation being applied
$V\hat{S}F_0 = C_0(1+\epsilon)$
$V\hat{S}F = C(1+\epsilon)$
$\hat{A} = A+\delta$
$\hat{B} = -Q_B - b$
$Q_P = S(1+A)*P$
$Q_M = S(1-A)*M$
S=average reset scale factor
P,M=number of plus(P), minus(M) reset By using the appropriate substitutions and by neglecting second order terms, the change in channel velocity ($\Delta$vel) equation becomes:

$$\Delta vel = S[\epsilon(-P+M-\hat{A}(P+M)) + \delta(P+M)]$$

from this equation, the plus (P) and minus (M) delta velocities are:

$$\Delta vel_P = -S\epsilon P - S\epsilon\hat{A}P + \delta PS$$

$$\Delta vel_M = -S\epsilon M - S\epsilon\hat{A}M + \delta MS$$

By disregarding the error in the bias compensation being applied as being relatively insignificant and since P=M due to the same number of positive and negative resets being applied, $\Delta vel_P - \Delta vel_M$ yields the voltage scale factor (VSF):

$$\varepsilon = \frac{-(\Delta vel_P - \Delta vel_M)}{2SP}$$

$$VSF = \frac{V\hat{S}F}{1+\varepsilon} \approx V\hat{S}F(1-\varepsilon) = V\hat{S}F + \frac{\Delta vel_P - \Delta vel_M}{2SP} * VS$$

Further, $\Delta vel_P + \Delta vel_M$ yields the asymmetry:

$$\delta = \frac{(\Delta vel_P + \Delta vel_M) + 2S}{2SP}$$

where substituting, $$\beta = \frac{\Delta vel_P + \Delta ve}{2SP},$$

provides $\delta = \beta + $—, and the asymmetry update equation becomes:

$$A = \hat{A} - \delta$$

Both of the equations for the voltage scale factor (VSF) and asymmetry (A) are update calculations which are updated during each cycle in step 504, so that they include fractional update gains in order to reduce the effects of noise. The calibration sequence preferably runs for the entire predetermined period of time to achieve the desired number of reset pairs for the calibration calculations, but the calibration sequence may run for a lower minimum period of time which provides an acceptable number of reset pairs for the calibration calculations. For the purposes of illustration only, the following table shows acceptable time periods for a typical 512 Hz flight computer:

|  | 512 Hz |
| --- | --- |
| Bias Calculation Min | ~0.09765 sec |
| Bias Calculation Max | ~64 sec |
| Number of Reset Pairs | ~8192 |
| Asym/VSF Cal Min | ~64 sec |
| Asym/VSF Cal Max | ~128.0 sec |
| Total Cal Max | ~192 sec |

The maximum bias calculation time is limited by a pre-selected period, e.g. 64 seconds for a 512 Hz system. If the bias calibration is aborted before the maximum time period is reached, the calibration channel bias will only be calculated at that time if the minimum bias calibration time period has been reached, e.g. 0.09765 sec for a 512 Hz system. The asymmetry and VSF calculations then occur after a predetermined number of acceptable reset pairs are obtained, e.g. 8192 pairs for a 512 Hz system. If the calibration sequence is operating ideally with no broken pairs, the asymmetry/VSF calibration will be complete in the minimum time period, e.g. 64 sec for a 512 Hz system. If the predetermined of acceptable reset pairs is not obtained within the maximum total predefined time period for calibration, e.g. 192 sec for a 512 Hz system, then a calibration channel failure is reported. During ideal operation, the bias portion of the calibration scheme will run for the maximum bias calibration time period while the asymmetry/VSF portion of the calibration scheme will run for the minimum asymmetry/VSF calibration time period.

The calibration routine will switch channels into and out of the calibration mode after each channel calibration is complete, such as by using a pointer pattern or other type of selection method. For instance, a plurality of switches may be employed which dictate which acceleration channels are connected to which respective quantizer channels, as illustrated by the following table:

| Quantizer | Acceleration Channel | | | |
| --- | --- | --- | --- | --- |
| Channel | Switch 1 | Switch 2 | Switch 3 | Switch 4 |
| 1 | X | Cal | X | X |
| 2 | Y | Y | Cal | Y |
| 3 | Z | Z | Z | Cal |
| 4 | Cal | X | Y | Z |

As can be seen from the foregoing, the system and method for providing an improved quantizer processing scheme according to the present invention provides a reset prioritization scheme which minimizes the chances of channel saturation, thus permitting a significantly higher acceleration capacity as well as improved accuracy for rapidly changing measurements. Furthermore, the improved quantizer processing scheme of the present invention provides a robust calibration scheme for a multiple-channel quantizer to accurately account for multiple sources of quantizer error, where the calibration calculations utilize incremental update equations to reduce velocity noise.

In each of the above embodiments, the different structures of the quantizer processing system and method of the present invention are described separately in each of the embodiments. However, it is the full intention of the inventors of the present invention that the separate aspects of each embodiment described herein may be combined with the other embodiments described herein.

What is claimed is:

1. A method of processing instrument data received by a multiple channel quantizer, comprising:

receiving instrument measurement data on a plurality of channels of the quantizer, wherein the instrument measurement data is received from signals on the plurality of channels transmitted from a respective plurality of instruments, wherein the quantizer includes an additional channel which is free from instrument data;

generating predicted instrument measurements to be received from the plurality of channels of the quantizer comprising the steps:

(a) converting the instrument signals received to integrated quantizer measurements using a scale factor;

(b) determining incremental integrated quantizer measurements from a difference between integrated quantizer measurements from the current measurement period and a previous measurement period, wherein the present integrated quantizer measurements are adjusted to account for resets which have been applied to the respective channel;

c) converting the incremental integrated quantizer measurements to incremental signals; and (d) extrapolating the instrument signals received using the incremental signals to generate the predicted instrument measurements;

sorting the predicted instrument measurements to determine a prioritization order for applying resets to channels to keep the channel signals beneath a saturation threshold, wherein resets are precise amounts of charge applied by current sources connected to the quantizer for raising or lowering a value of the signal appearing on the channel accordingly; and applying resets to the respective channels of the quantizer based on the determined prioritization order to keep the data channels below a saturation threshold.

2. The method of claim 1, wherein the present integrated quantizer measurements are further adjusted to account for calibration information for the respective channels.

3. A method of processing instrument data received by a multiple channel quantizer, comprising:

receiving instrument measurement data on a plurality of channels of the quantizer, wherein the instrument measurement data is received from signals on the plurality of channels transmitted from a respective plurality of instruments, wherein the quantizer includes an additional channel which is free from instrument data;

generating predicted instrument measurements to be received from the plurality of channels of the quantizer;

sorting the predicted instrument measurements to determine a prioritization order for applying resets to channels to keep the channel signals beneath a saturation threshold, wherein resets are precise amounts of charge applied by current sources connected to the quantizer for raising or lowering a value of the signal appearing on the channel, sorting the predicted instrument measurements comprising:
(a) determining which channel possesses a largest predicted instrument measurement;
(b) determining whether the largest predicted instrument measurement is above a saturation threshold value;
(c) placing the channel having the largest predicted instrument measurement which is above the saturation threshold value in the prioritization order as the next channel to have a reset applied thereto;
(d) adjusting the largest predicted instrument measurement to account for the reset to be applied; and
(e) repeating steps (a)–(d) until either all of the channels have a predicted instrument measurement beneath the saturation threshold value or until the prioritization order is complete; and
applying resets to the respective channels of the quantizer based on the determined prioritization order to keep the data channels below a saturation threshold.

4. A method of processing instrument data received by a multiple channel quantizer, comprising:
receiving instrument measurement data on a plurality of channels of the quantizer, wherein the instrument measurement data is received from signals on the plurality of channels transmitted from inertial navigation instruments,
wherein the quantizer includes an additional channel which is free from instrument data;
generating predicted instrument measurements to be received from the plurality of channels of the quantizer;
sorting the predicted instrument measurements to determine a prioritization order for applying resets to channels to keep the channel signals beneath a saturation threshold, wherein resets are precise amounts of charge applied by current sources connected to the quantizer for raising or lowering a value of the signal appearing on the channel accordingly; and
applying resets to the respective channels of the quantizer based on the determined prioritization order to keep the data channels below a saturation threshold.

5. The method of claim 4, wherein inertial navigation instruments are accelerometers.

6. A method of processing instrument data received by a multiple channel quantizer, comprising:
receiving instrument measurement data on a plurality of channels of the quantizer, wherein the instrument measurement data is received from signals on the plurality of channels transmitted from a respective plurality of instruments, wherein the quantizer includes an additional channel which is free from instrument data;
generating predicted instrument measurements to be received from the plurality of channels of the quantizer;
sorting the predicted instrument measurements to determine a prioritization order for applying resets to channels to keep the channel signals beneath a saturation threshold, wherein resets are precise amounts of charge applied by current sources connected to the quantizer for raising or lowering a value of the signal appearing on the channel accordingly; and
applying resets to the respective channels of the quantizer based on the determined prioritization order to keep the data channels below a saturation threshold and based on a calibration performed on the channel free from instrument data; and
calculating calibration information for the quantizer channel free from instrument data, wherein the calculated calibration information includes a calibration channel bias.

7. The method of claim 6 wherein the calculated calibration channel bias determines a leakage current appearing on the calibration channel when the calibration channel is free from inputs.

8. The method of claim 6 where the calculated calibration channel bias calculation comprises:
converting signals received from the calibration channel to integrated quantizer measurements using a scale factor;
determining incremental integrated quantizer measurements;
summing the incremental integrated quantizer measurements over a predetermined period of time;
calculating an average value of the summed incremental integrated quantizer measurements over the predetermined period of time as long as a reset was not detected to have been applied to the channel in calibration during the predetermined period of time.

9. The method of claim 8, further comprising:
determining whether the incremental integrated quantizer measurements have been summed for a measured period of time greater than a predefined minimum period of time when a reset is detected to have been applied to the channel in calibration within the predetermined period of time; and
calculating an average value of the summed incremental integrated quantizer measurements over the measured period of time when the measured period of time is greater than the predefined minimum period of time.

10. The method of claim 8, further comprising initially applying resets to the calibration channel prior to the calibration channel bias calculation to adjust the channel signal to a predefined level.

11. The method of claim 6, wherein the calculated calibration information includes calculating an asymmetry value between the current sources.

12. The method of claim 11, wherein the asymmetry value is calculated using an update equation which is updated during each measurement period according to the following equation:

$$A = \hat{A} - \delta$$

wherein $\hat{A}$ is an asymmetry value calculated during the previous measurement period and $\delta$ is an asymmetry update value.

13. The method of claim 12 wherein the asymmetry update value, $\delta$, is calculated according to the following equation:

$$\delta = \frac{(\Delta vel_P + \Delta vel_M) + 2S\hat{A}\varepsilon}{2SP},$$

where
$\varepsilon$ is the relative voltage scale factor error,
$\Delta vel_P$ is an incremental integrated quantizer measurement for a positive reset applied,
$\Delta vel_M$ is an incremental integrated quantizer measurement for a negative reset applied,
S is the average reset scale factor, and
P is the number of resets applied by each current source.

14. The method of claim 6, wherein the calculated calibration information includes calculating a voltage scale factor for the channel in calibration.

15. The method of claim 14, wherein the voltage scale factor, VSF, is calculated using an update equation which is updated during each measurement period according to the following equation:

$$VSF = \frac{V\hat{S}F}{1+\varepsilon} \cong V\hat{S}F(1-\varepsilon)$$

wherein $V\hat{S}F$ is a voltage scale factor calculating during the previous measurement period and $\epsilon$ is a voltage scale factor update value.

16. The method of claim 15, wherein the voltage scale factor update value, $\epsilon$, is calculated according to the following equation $$\varepsilon = \frac{-(\Delta vel_P - \Delta vel_M)}{2SP},$$

wherein $\Delta vel_P$ is an incremental integrated quantizer measurement for a positive reset applied, $\Delta vel_M$ is an incremental integrated quantizer measurement for a negative reset applied, S is the average reset scale factor, and P is the number of resets applied by each current source.

17. The method of claim 6, wherein the calibration information calculation step is only performed when all of the resets to be applied during a next measurement period are not required for the plurality of channels containing inertial navigation instrument measurements.

* * * * *